(12) United States Patent
Poplack et al.

(10) Patent No.: US 7,606,697 B2
(45) Date of Patent: Oct. 20, 2009

(54) SYSTEM AND METHOD FOR RESOLVING ARTIFACTS IN DIFFERENTIAL SIGNALS

(75) Inventors: Mitchell G. Poplack, San Jose, CA (US); John A. Maher, San Jose, CA (US)

(73) Assignee: Quickturn Design Systems, Inc., San Jose, CA (US)

(*) Notice: Subject to any disclaimer, the term of this patent is extended or adjusted under 35 U.S.C. 154(b) by 363 days.

(21) Appl. No.: 11/141,141

(22) Filed: May 31, 2005

(65) Prior Publication Data

US 2005/0278163 A1 Dec. 15, 2005

Related U.S. Application Data

(60) Provisional application No. 60/576,611, filed on Jun. 1, 2004, provisional application No. 60/576,691, filed on Jun. 1, 2004.

(51) Int. Cl.
*G06F 9/455* (2006.01)
*G06F 19/00* (2006.01)

(52) U.S. Cl. ............... 703/25; 375/214; 702/126

(58) Field of Classification Search ............ 703/23, 703/25; 375/214; 702/126
See application file for complete search history.

(56) References Cited

U.S. PATENT DOCUMENTS

| | | | |
|---|---|---|---|
| 5,109,353 A | 4/1992 | Sample et al. | |
| 5,126,966 A | 6/1992 | Hafeman et al. | |
| 5,377,124 A | 12/1994 | Mohsen | |
| 5,414,638 A | 5/1995 | Verheyen et al. | |
| 5,475,830 A | 12/1995 | Chen et al. | |
| 5,544,069 A | 8/1996 | Mohsen | |
| 5,551,013 A | 8/1996 | Beausoleil et al. | ............ 703/23 |
| 5,574,388 A | 11/1996 | Barbier et al. | ............... 326/41 |
| 5,596,742 A | 1/1997 | Agrawal et al. | |
| 5,649,176 A | 7/1997 | Selvidge et al. | |
| 5,654,564 A | 8/1997 | Mohsen | .................... 251/209 |
| 5,659,716 A | 8/1997 | Selvidge et al. | |
| 5,754,827 A | 5/1998 | Barbier et al. | |
| 5,761,484 A | 6/1998 | Agarwal et al. | |
| 5,777,489 A | 7/1998 | Barbier et al. | ............... 326/40 |
| 5,790,832 A | 8/1998 | Barbier et al. | |
| 5,802,348 A | 9/1998 | Stewart et al. | |
| 5,822,564 A | 10/1998 | Chilton et al. | |
| 5,847,578 A | 12/1998 | Noakes et al. | ................. 326/39 |
| 5,850,537 A | 12/1998 | Selvidge et al. | |

(Continued)

*Primary Examiner*—Paul L Rodriguez
*Assistant Examiner*—Andre Pierre Louis
(74) *Attorney, Agent, or Firm*—Orrick, Berrington & Sutcliffe LLP

(57) ABSTRACT

A signal conversion system for interfacing selected components of a communication system and methods for manufacturing and using same. The signal conversion system converts selected logic signals from one system component into a pair of differential logic signals and provides the pair of differential logic signals to a second system component, resolving any logical and/or temporal artifacts. While one or more of the selected logic signals change signal state, the signal conversion system maintains the pair of differential logic signals in a first valid combined signal state until the signal state of the selected logic signals corresponds to a second valid combined signal state for the pair of differential logic signals. The signal verification system then updates the pair of differential logic signals to have the second valid combined signal state. The system components thereby can communicate, exchanging differential communication signals while maintaining duty cycle and avoiding signaling glitches.

18 Claims, 10 Drawing Sheets

U.S. PATENT DOCUMENTS

| | | |
|---|---|---|
| 5,854,752 A | 12/1998 | Agarwal |
| 5,884,066 A | 3/1999 | Kuijsten |
| 5,920,712 A | 7/1999 | Kuijsten |
| 5,963,736 A | 10/1999 | Sarno et al. |
| 6,020,760 A | 2/2000 | Sample et al. ............... 326/41 |
| 6,034,857 A | 3/2000 | Sample et al. ............. 361/93.2 |
| 6,035,117 A | 3/2000 | Beausoleil et al. ........... 703/25 |
| 6,051,030 A | 4/2000 | Beausoleil et al. ........... 703/20 |
| 6,058,492 A | 5/2000 | Sample et al. ............... 714/33 |
| 6,061,511 A | 5/2000 | Marantz et al. |
| 6,175,248 B1 * | 1/2001 | Mack ......................... 326/63 |
| 6,223,148 B1 | 4/2001 | Stewart et al. |
| 6,259,588 B1 | 7/2001 | Sample et al. ............. 361/93.2 |
| 6,285,211 B1 | 9/2001 | Sample et al. ............... 326/41 |
| 6,377,912 B1 | 4/2002 | Sample et al. ............... 703/28 |
| 6,499,122 B1 | 12/2002 | Coomes |
| 6,583,647 B2 * | 6/2003 | Kim et al. ..................... 326/81 |
| 6,618,698 B1 | 9/2003 | Beausoleil et al. ........... 703/23 |
| 6,681,377 B2 | 1/2004 | Beletsky ........................ 716/6 |
| 6,694,464 B1 | 2/2004 | Quayle et al. ............... 714/725 |
| 6,697,957 B1 | 2/2004 | Wang et al. ................. 713/401 |
| 6,779,140 B2 | 8/2004 | Krech et al. |
| 6,842,729 B2 | 1/2005 | Sample et al. ............... 703/24 |
| 6,850,880 B1 | 2/2005 | Beausoleil et al. ........... 703/23 |
| 6,901,359 B1 | 5/2005 | Beausoleil et al. ........... 703/24 |
| 6,912,675 B2 | 6/2005 | Swoboda |
| 7,093,051 B2 | 8/2006 | Haig et al. |
| 2002/0052729 A1 * | 5/2002 | Kyung et al. ................. 703/28 |
| 2005/0066088 A1 | 3/2005 | Helfinstine et al. |
| 2005/0083996 A1 * | 4/2005 | Robinson et al. ............ 375/131 |
| 2006/0044018 A1 | 3/2006 | Chang |
| 2007/0186261 A1 * | 8/2007 | Geile et al. ................. 725/126 |
| 2007/0230611 A1 * | 10/2007 | Sorrells et al. .............. 375/295 |

* cited by examiner

US 7,606,697 B2

SYSTEM AND METHOD FOR RESOLVING ARTIFACTS IN DIFFERENTIAL SIGNALS

CROSS-REFERENCE TO RELATED APPLICATIONS

This application claims priority to U.S. Provisional Application Ser. No. 60/576,611 and U.S. Provisional Application Ser. No. 60/576,691, each being filed on Jun. 1, 2004. Priority to these prior applications is expressly claimed, and the disclosures of respective applications are hereby incorporated by reference in their entireties.

FIELD

The present invention relates generally to hardware emulation systems for verifying electronic circuit designs and more particularly, but not exclusively, to interface systems for coupling such hardware emulation systems with other system components in emulation.

BACKGROUND

Emulation systems are used to verify electronic circuit designs prior to fabrication as chips or manufacture as electronic systems. Typical emulation systems utilize either interconnected programmable logic chips or interconnected processor chips. Examples of hardware logic emulation systems using programmable logic devices can be seen in, for example, U.S. Pat. Nos. 5,109,353, 5,036,473, 5,475,830 and 5,960,191. U.S. Pat. Nos. 5,109,353, 5,036,473, 5,475,830 and 5,960,191 are incorporated herein by reference. Examples of hardware logic emulation systems using processor chips can be seen in, for example, U.S. Pat. Nos. 5,551,013, 6,035,117 and 6,051,030. U.S. Pat. Nos. 5,551,013, 6,035,117 and 6,051,030 are incorporated herein by reference.

The design under verification (or test) ("DUV") is usually provided in the form of a netlist description of the design. The netlist may have been derived from many sources, including from a hardware description language. A netlist description (or "netlist", as it is referred to by those of ordinary skill in the art) is a description of the circuit's components and electrical interconnections between the components. The components include all those circuit elements necessary for implementing a logic circuit, such as combinational logic (e.g., gates) and sequential logic (e.g., flip-flops and latches). In prior art emulation systems, the netlist is compiled such that it is placed in a form that can be used by the emulation system. In an FPGA-based emulator, the DUV is compiled into a form that allows the logic gates (both sequential and combinational) to be implemented in the FPGAs. In a processor-based emulation system, the DUV is compiled into a series of statements that will be executed by the processors on the processor chips. No logic is implemented into these processors.

Conventional hardware emulation systems include target interface systems for coupling with one or more user testbenches and/or target systems. A "target system" is, generally speaking, the actual operating environment that the DUV, once manufactured, will be installed. Thus, the target system for a microprocessor DUV can be a personal computer. A "testbench," in this context, is an application that may apply a set of stimuli (such as a test vector) to a model to produce a set of information used in analyzing the timing or performance of a system block. The target interface systems of these hardware emulation systems suffer from several limitations. For example, the input/output (I/O) technologies employed by such target interface systems are not suitable for supporting differential signaling technologies. Connection to a differential target system requires the use of additional technology conversion hardware, which generally must be custom made. The design under test thereby is required to expose a single logical signal as a primary I/O (as opposed to possibly two nets), requiring manual intervention into the netlist of the design.

Other disadvantages of the target interface systems of conventional hardware emulation systems include the use of fixed input/output (I/O) technologies. The target interface systems likewise provide limited I/O timing control as well as a limited number of directional signals for bidirectional signals. Further, conventional target interface systems cannot verify the validity of the I/O voltage of the target system and are unable to detect whether the target system is powered on, powered off, or unconnected.

In view of the foregoing, a need exists for an improved hardware emulation system that overcomes the aforementioned obstacles and deficiencies of currently-available hardware emulation systems.

Figure 1:
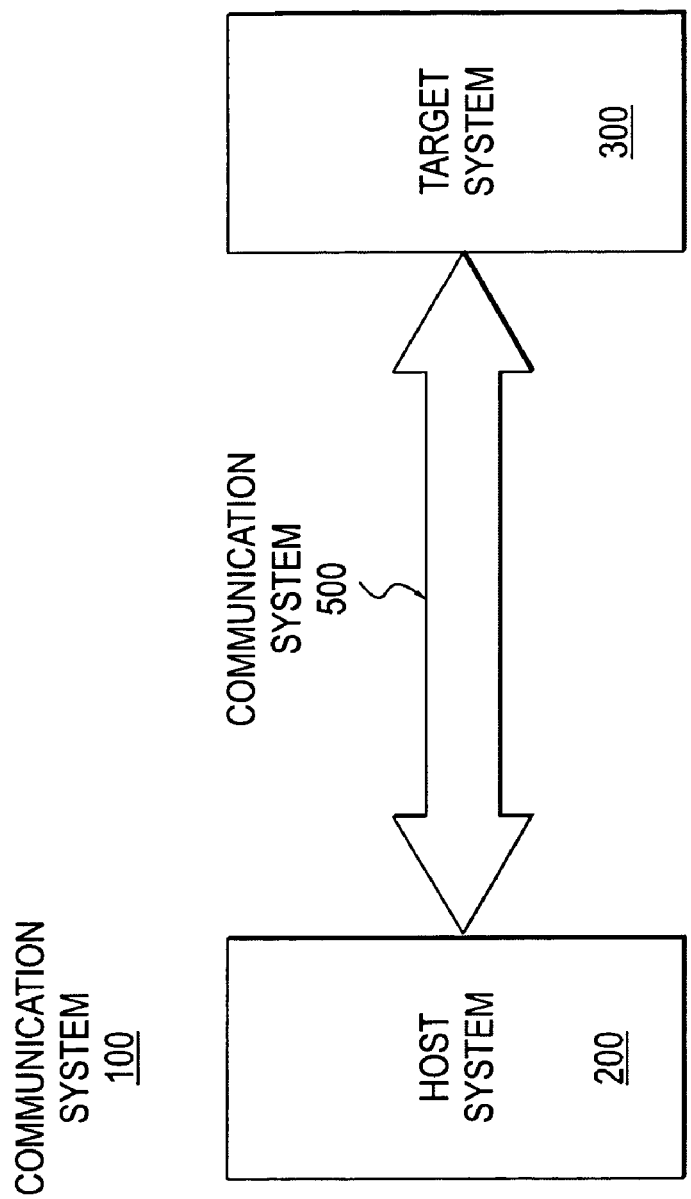
FIG. 1 is an exemplary top-level block diagram illustrating an embodiment of a communication system in which the communication system includes a host system and a target system.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not describe every aspect of the present invention and do not limit the scope of the invention.

DETAILED DESCRIPTION OF THE DRAWINGS

Since conventional hardware emulation systems suffer from several limitations, such as the inability to support differential signaling technologies, a communication system that includes a target interface system for resolving logical and temporal artifacts of differential signals while maintaining duty cycle and avoiding signaling glitches can prove much more desirable and provide a basis for a wide range of system applications, such as hardware emulation systems. This result can be achieved, according to one embodiment disclosed herein, by employing a communication system 100 as shown in FIG. 1.

The communication system 100 can be provided in any suitable manner, including the manner disclosed in co-pending U.S. patent application, entitled "SYSTEM AND METHOD FOR CONFIGURING COMMUNICATION SYSTEMS," Ser. No. 10/992,165, filed on Nov. 17, 2004, which is assigned to the assignee of the present application and the disclosure of which is hereby incorporated herein by reference in its entirety. As shown in FIG. 1 herein, the exemplary communication system 100 can comprise a host system 200 and at least one target system 300. Typically being coupled via one or more communication cable assemblies 400 (shown in FIG. 2), the host system 200 and each target system 300 are configured to communicate such that communication signals 500 can be exchanged among the host system 200 and the target systems 300.

Figure 2:
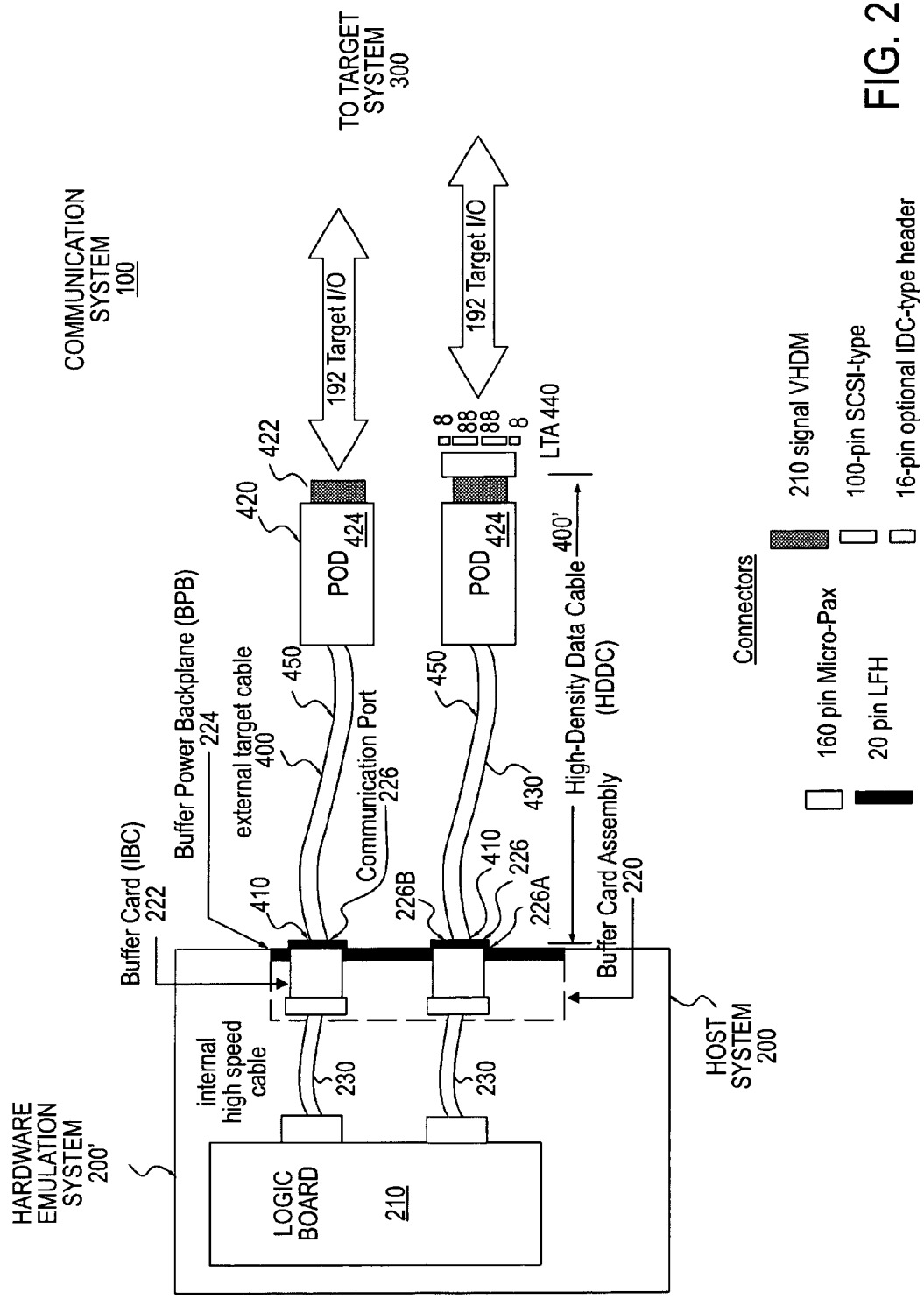
FIG. 2 is an exemplary block diagram illustrating an embodiment of the communication system of FIG. 1 in which the communication system comprises a hardware emulation system for developing one or more components of the target system.

Turning to FIG. 2, the communication system 100 is illustrated as comprising a hardware emulation system 200', such as an accelerator, a simulator, and/or an emulator, for developing the target system 300 and/or one or more components of the target system 300. Prior to manufacture of an integrated circuit, designers generally verify the functionality of their designs (referred to herein as the "design under verification"). The communication system 100 therefore preferably is provided as a hardware emulation system 200' to allow the designers to verify that a design under verification will function in the system in which the integrated circuit will eventually reside (i.e., the target system 300). Exemplary hardware emulation systems include the Palladium acceleration/emulation system and the NC-Sim simulation system each produced by Cadence Design Systems, Inc., of San Jose, Calif.

Further details and features relating to the structure and operation of the communication system 100 and/or the hardware emulation system 200' are disclosed in the following co-pending United States Patent Applications filed on the same date herewith: "SYSTEM AND METHOD FOR PROVIDING FLEXIBLE SIGNAL ROUTING AND TIMING," application Ser. No. 11/140,714; "SYSTEM AND METHOD FOR RELIABLY SUPPORTING MULTIPLE SIGNALING TECHNOLOGIES," application Ser. No. 11/140,722; "EXTENSIBLE MEMORY ARCHITECTURE AND COMMUNICATION PROTOCOL FOR SUPPORTING MULTIPLE DEVICES IN LOW-BANDWIDTH, ASYNCHRONOUS APPLICATIONS," application Ser. No. 11/141,599, which are assigned to the assignee of the present application and the respective disclosures of which are hereby incorporated herein by reference in their entireties.

The hardware emulation system 200' shown in FIG. 2 includes a logic board 210 and a buffer card assembly 220. The logic board 210 is a printed circuit board carrying either logic devices and interconnect devices or processor chips. Illustrated as being coupled with the logic board 210 via one or more internal high-speed communication cables 230, the buffer card assembly 220 provides an input/output (I/O) system for the hardware emulation system 200'. The buffer card assembly 220 includes at least one interface buffer card 222 for providing buffering to electrically protect the emulation modules of the logic board 210 from external effects and a buffer power backplane 224. Preferably providing power to each interface buffer card 222, the buffer power backplane 224 likewise provides information regarding the location of each interface buffer card 222 for the purposes of configuration detection and verification.

The target system 300 likewise can include other peripheral systems and subsystems of the hardware emulation system 200', as desired. Because such emulated representations allow a circuit designer flexibly to operate or develop the target system 300 coupled to the emulated representation, even before the prototype circuit design or hardware is actually manufactured, overall design time and cost is reduced significantly. As desired, other peripheral systems (not shown), such as one or more additional hardware or software development platforms, computers, and/or test equipment, also may be coupled with the host system 200 and/or the target system 300. By providing an emulation environment for the target system 300, the host system 200 can for perform functional verification for all of, or at least one component of, the target system 300 in any appropriate manner. The host system 200, for instance, can provide co-simulation and/or simulation acceleration and/or can be configured for in-circuit use. The host system 200 likewise can provide a platform for performing hardware and software co-verification for the target system 300.

For example, the target system 300 can include a logic circuit and can be assembled, along with one or more electronic components, such as integrated components and/or discrete components, on a hardware development platform (not shown) in the manner known in the art. Exemplary logic circuits can include reconfigurable logic circuits, such as one or more field-programmable gate arrays (FPGAs), and/or non-reconfigurable logic circuits, such as one or more application-specific integrated circuits (ASICs). Once assembled, the reconfigurable logic circuit can be customized to implement a user design by loading configuration data into the reconfigurable logic circuit. By programming the internal memory cells, a customized configuration is established within the reconfigurable logic circuit. Thereby, the user design can be implemented by the reconfigurable logic circuit and evaluated by operating the reconfigurable logic circuit on the hardware development platform and in conjunction with the hardware emulation system and any other peripheral systems.

Each interface buffer card 222 includes at least one communication port 226 for coupling the hardware emulation system 200' with one or more target systems 300, communication cable assemblies 400, and/or other external systems or devices. Each communication port 226 includes a connector assembly 226A having a plurality of contacts, pins, or terminals 226B, such as user-definable terminals and/or reserved terminals. Each communication port 226 can have any appropriate number of terminals 226B, which number can be related to the number of communication signals 500 (shown in FIG. 1) to be supported by the communication port 226. The communication signals 500 thereby can be exchanged among the hardware emulation system 200' with one or more target systems 300, communication cable assemblies 400, and/or other external systems or devices, as desired.

The buffer card assembly 220 of the hardware emulation system 200' is illustrated in FIG. 2 as being configured to couple with the target systems 300 via communication cable assemblies 400. Therefore, the buffer card assembly 220 and the communication cable assemblies 400 can form a target interface system 450 for coupling the hardware emulation system 200' and the target systems 300. Although any suitable type of communication cable assemblies 400 can be used to couple the hardware emulation system 200' with the target systems 300, the communication cable assemblies 400 preferably comprise at least one high-density data cable 400' and/or at least one direct attach stimulus cable (not shown).

As shown in FIG. 2, each of the high-density data cables 400' can include an emulator connector assembly 410 and a target connector assembly 420 that are coupled via a communication cable 430. Although shown and described as being provided adjacent to the opposite end regions of the communication cable 430 for purposes of illustration, the emulator connector assembly 410 and the target connector assembly 420 can be associated with any suitable portion, such as an intermediate region, of the communication cable 430 and can be provided in any suitable manner. Being configured to couple with, and/or mate with, communication ports (not shown) of the target systems 300, the target connector assembly 420 is illustrated as comprising a connector assembly 422 and an interface system (or pod) 424. The interface system (or pod) 424 can include analog and/or digital devices and is configured to perform one or more functions associated with the target interface system 450. Preferably, the bulk of the functions associated with the target interface system 450 are performed by the interface system (or pod) 424.

As desired, a legacy target adapter 440 can disposed between the target connector assembly 420 and the target systems 300 as illustrated in FIG. 2. The legacy target adapter 440 can be configured to provide back-compatibility to the legacy form factor for conventional target systems 300, such as conventional target systems 300 supported by Cadence Design Systems, Inc., of San Jose, Calif. In the manner discussed above with regard to the target connector assembly 420, the emulator connector assembly 410 can include a connector assembly (not shown) for coupling with, and/or mating with, the communication ports 226 of the hardware emulation system 200'. Thereby, the hardware emulation system 200' and the target systems 300 can be coupled, and configured to communicate, such that the communication signals 500 are exchanged via the communication cable assemblies 400.

Figure 3:
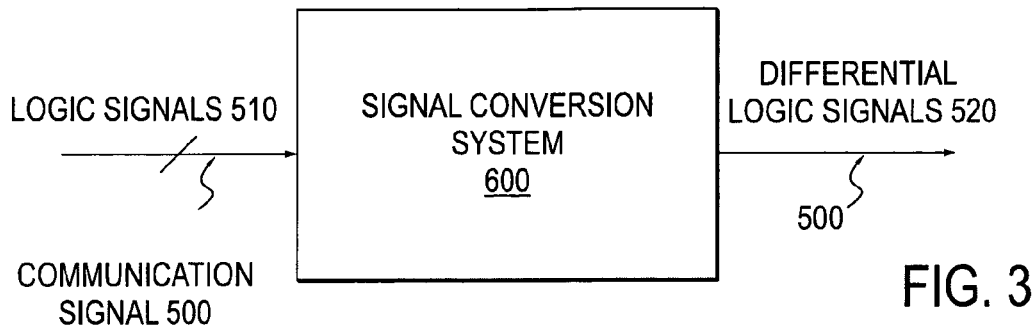
FIG. 3 is an exemplary top-level block diagram illustrating an embodiment of a signal conversion system for the communication systems of FIGS. 1 and 2 in which the signal conversion system is configured to convert incoming logic signals into pairs of differential logic signals.

The communication system 100 likewise includes a signal conversion system 600 as shown in FIG. 3. The signal conversion system 600 is configured to receive incoming logic signals 510 and to convert the selected logic signals 510' (shown in FIG. 8) into pairs of differential logic signals 520. The logic signals 510 can comprise any suitable type of logic signals, such as single-ended logic signals and/or differential logic signals, and can be selected in any appropriate number, including individual logic signals and/or pairs of logic signals, for conversion into the pairs of differential logic signals 520. To help ensure that the pairs of differential logic signals 520 are provided with valid signal states, the signal conversion system 600 preferably performs signal validation, as desired, such that the differential logic signals 520 in the pair are consistent.

Although shown and discussed herein with reference to logic signals 510 provided by the hardware emulation system 200' (shown in FIG. 2) for purposes of illustration, the signal conversion system 600 can receive and convert incoming logic signals 510 from any suitable source, including one or more of the target systems 300 (shown in FIG. 1), communication cable assemblies 400 (shown in FIG. 2), and/or external systems or devices. The signal conversion system 600 likewise can be associated with the hardware emulation system 200', the target system 300, the communication cable assemblies 400, and/or the other external systems or devices, as desired. For example, the signal conversion system 600 can be disposed on the logic board 210 and/or within the buffer card assembly 220 of the hardware emulation system 200', coupled with the input/output (I/O) system of the relevant target system 300, and/or provided via the emulator connector assembly 410 (shown in FIG. 2), the target connector assembly 420 (shown in FIG. 2), and/or the interface system (or pod) 424 (shown in FIG. 2) of the appropriate high-density data cable 400' (shown in FIG. 2).

To facilitate signal the conversion of the logic signals 510, the communication system 100 can include a plurality of signal conversion systems 600. In addition, or in the alternative, each signal conversion system 600 can be configured to simultaneously select and convert a plurality of logic signals 510 to provide a plurality of pairs of differential logic signals 520. The logic signals 510 thereby can be more rapidly converted into the pairs of differential logic signals 520, which can provide advantageous, for example, when a large number of logic signals 510, such as data signals 510D (shown in FIG. 9), address signals, and/or control signals 510C (shown in FIG. 9), are to be converted during short periods of time.

The communication system 100 likewise includes a signal conversion system 600 as shown in FIG. 3. The signal conversion system 600 is configured to receive logic signals 510 and to convert the selected logic signals 510' (shown in FIG. 8) into pairs of differential logic signals 520. The logic signals 510 can comprise any suitable type of logic signals, including single-ended logic signals, and can be selected in any appropriate number, such as individually and/or in pairs, for conversion into the pairs of differential logic signals 520. To help ensure that the pairs of differential logic signals 520 are provided with valid signal states, the signal conversion system 600 preferably performs signal validation, as desired, such that the differential logic signals 520 in the pair are consistent.

Figure 4A:
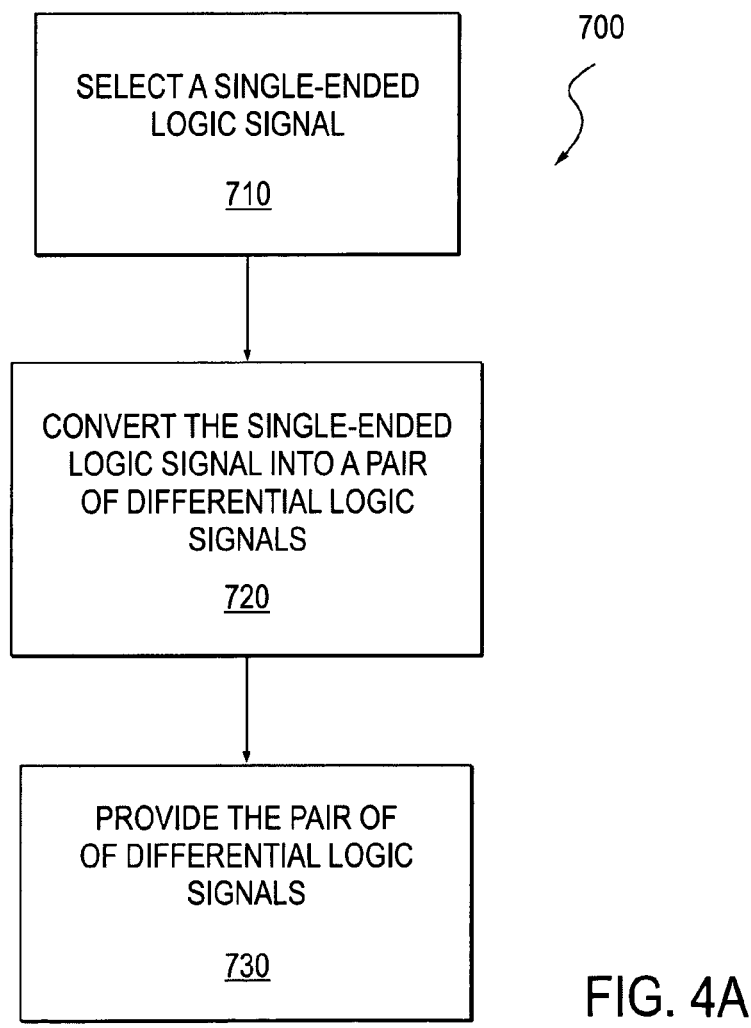
FIG. 4A is an exemplary flowchart illustrating a method for converting incoming single-ended logic signals into pairs of differential logic signals.
Figure 4B:
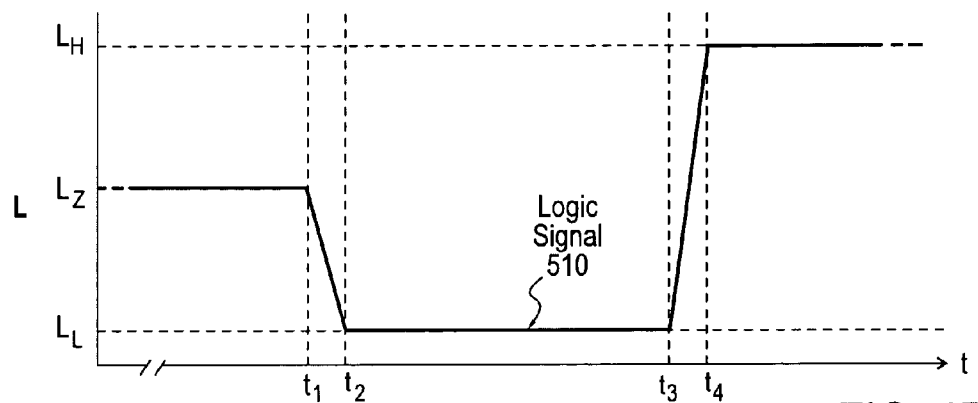
FIGS. 4B-C are an exemplary timing diagram illustrating the method of FIG. 4A by which an illustrative single-ended logic signal is converted into a pair of differential logic signals.
Figure 4C:
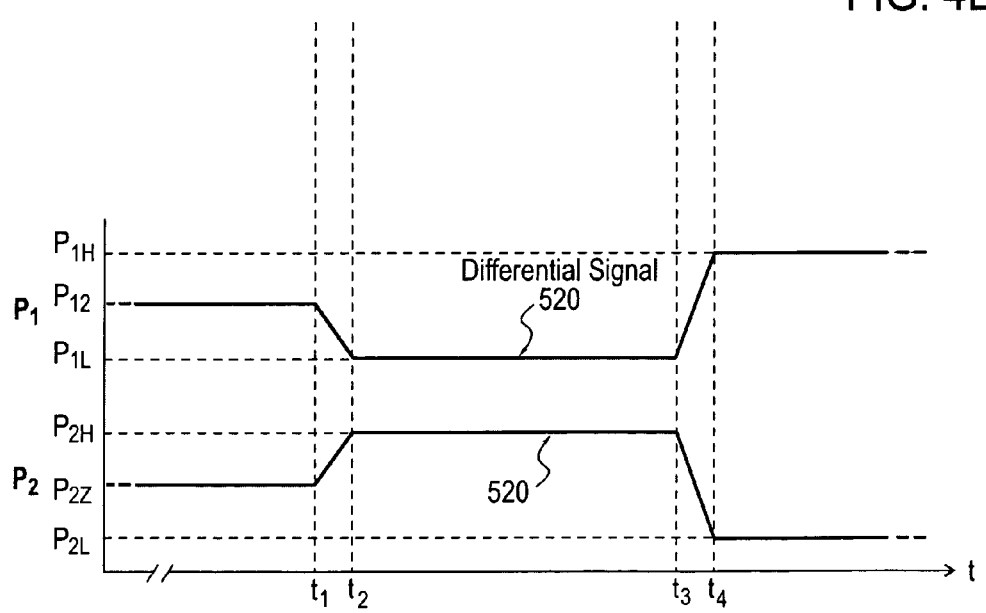

The operation of the signal conversion system 600 is illustrated in FIGS. 4A-C with reference to logic signals 510 that comprise single-ended logic signals. An exemplary method 700 for converting the single-ended logic signals L (shown in FIG. 4B) is illustrated in FIG. 4A. Turning to FIG. 4A, the method 700 includes, at 710, selecting at least one of the single-ended logic signals L. The single-ended logic signals L can be selected in accordance with any preselected criteria, such as based upon chronology and/or priority. Any suitable number of the single-ended logic signals L can be selected such that, for example, the logic signals 510 are converted individually or in groups, such as in bytes, words, and/or double words.

Each of the selected single-ended logic signals L, at 720, are converted into a pair of differential logic signals 520, such as differential logic signals $P_1$, $P_2$ (shown in FIG. 4C). The selected single-ended logic signals L can be converted into pairs of differential logic signals 520 in any conventional manner. For example, in the manner set forth in more detail below with reference to FIGS. 4B-C, each selected single-ended logic signal L can be converted by providing the relevant single-ended logic signal L, in inverted and noninverted forms, as the pairs of differential logic signals $P_1$, $P_2$. Stated somewhat differently, the first differential logic signal $P_1$ can comprise the relevant selected single-ended logic signal L; whereas, the relevant selected single-ended logic signal L can be inverted to form the second differential logic signal $P_2$.

Once the selected single-ended logic signal L has been converted, the pairs of differential logic signals 520 can be provided, at 730, as desired. The pairs of differential logic signals 520 can be provided in any suitable manner. If the logic signals 510 are converted individually, the pairs of differential logic signals 520 can be individually provided after each selected single-ended logic signal L has been converted. The pairs of differential logic signals 520 likewise can be provided in groups, for instance, when the single-ended logic signals 510 are converted in groups. When the logic signals 510 are provided by the hardware emulation system 200' (shown in FIG. 2), the pairs of differential logic signals 520 can be provided to the input/output (I/O) system of the hardware emulation system 200' for transmission to the relevant target systems 300 (shown in FIG. 1), communication cable assemblies 400 (shown in FIG. 2), and/or external systems or devices.

FIGS. 4B-C illustrate one manner of converting the exemplary single-ended logic signal L into the illustrative pair of differential logic signals $P_1$, $P_2$. The single-ended logic signal L and the differential logic signals $P_1$, $P_2$ preferably comprise conventional logic signals of any kind. Although the logic signals 510 and the differential logic signals 520 can have any appropriate number of signal states, the logic signal L and differential logic signals $P_1$, $P_2$ each are shown and described for purposes of illustration as having three separate signal states: a high voltage (or logic) state, a low voltage (or logic) state, and a high-impedance signal state. Since the logic signal L and differential logic signals $P_1$, $P_2$ are not driven in the respective high-impedance signal states, each high-impedance signal states is illustrated with a voltage (or logic) level intermediate between the relevant low and high voltage (or logic) states.

Prior to time $t_1$, the logic signal L is shown as being in the high-impedance signal state with an intermediate voltage level $L_Z$. The logic signal L likewise has the low voltage level $L_L$ of the low logic state between time $t_2$ and time $t_3$ and the high voltage level $L_H$ of the high logic state after time $t_4$ as shown in FIG. 4B. The logic signal L also is illustrated as transitioning from the intermediate voltage level $L_Z$ of the high-impedance signal state to the low voltage level $L_L$ of the low logic state between time $t_1$ and time $t_2$ and as transitioning from the low voltage level $L_L$ of the low logic state to the high voltage level $L_H$ of the high logic state between time $t_3$ and time $t_4$. Although shown and described as being transitions over finite periods of time for purposes of illustration, the signal state changes of the logic signal L can be provided in any desired manner, such as over negligible periods of time such that the signal state changes of the logic signal L resemble step functions.

The illustrative pair of differential logic signals $P_1$, $P_2$ corresponding to the exemplary logic signal L is shown in FIG. 4C. The first differential logic signal $P_1$ is illustrated as comprising the exemplary logic signal L; whereas, the exemplary logic signal L has been inverted to provide the second differential logic signal $P_2$ of FIG. 4C. In the manner set forth above with reference to the exemplary logic signal L, the first differential logic signal $P_1$ is shown as having the intermediate voltage level $P_{1Z}$ of the high-impedance signal state prior to time $t_1$, the low voltage level $P_{1L}$ of the low logic state between time $t_2$ and time $t_3$, and the high voltage level $P_{1H}$ of the high logic state after time $t_4$. The second differential logic signal $P_2$, in contrast, has the intermediate voltage level $P_{2Z}$ of the high-impedance signal state prior to time $t_1$, the high voltage level $P_{2H}$ of the high logic state between time $t_2$ and time $t_3$, and the low voltage level $P_{2L}$ of the low logic state after time $t_4$.

As desired, the respective high voltage levels $L_H$, $P_{1H}$, $P_{2H}$ can be uniform and/or different. The respective low voltage levels $L_L$, $P_{1L}$, $P_{2L}$ likewise can be uniform and/or different. Preferably, the voltage levels are uniform between the differential logic signals $P_1$, $P_2$ such that the high voltage levels $P_{1H}$, $P_{2H}$ are uniform and the low voltage levels $P_{1L}$, $P_{2L}$ are uniform. In the manner set forth above with regard to the logic signal L, the signal state changes of the differential logic signals $P_1$, $P_2$ are shown and described as being transitions over finite periods of time for purposes of illustration only. The signal state changes of the differential logic signals $P_1$, $P_2$ can be provided in any desired manner, such as over negligible periods of time such that the signal state changes of the differential logic signals $P_1$, $P_2$ resemble step functions.

Figure 5A:
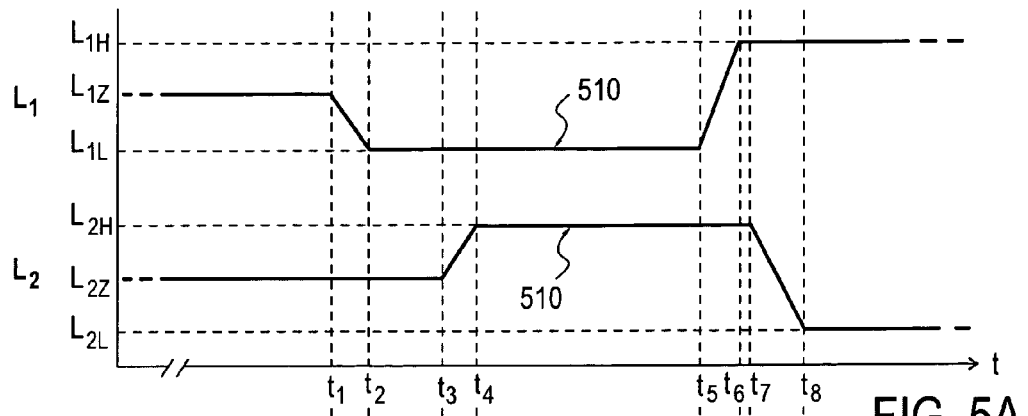
FIG. 5A is an exemplary timing diagram illustrating a pair of illustrative incoming logic signals to be converted into a pair of differential logic signals.

The signal conversion system 600 (shown in FIG. 3) likewise can be configured to convert pairs of logic signals 510 into the pairs of differential logic signals 520. The conversion of the pairs of logic signals 510 can present special challenges, which can be advantageously overcome via the signal conversion system 600. FIGS. 5A-D illustrate several illustrative challenges associated with the conversion of the pairs of logic signals 510 into the pairs of differential logic signals 520. It will be appreciated that the illustrative challenges described herein are merely exemplary and not exhaustive. In the manner set forth with regard to FIGS. 4B-C, the challenges associated with the conversion of the pairs of logic signals 510 into the pairs of differential logic signals 520 are shown and described with reference to several manners for converting an exemplary pair of logic signals $L_1$, $L_2$ as shown in FIG. 5A into the illustrative pairs of differential logic signals $P_1$, $P_2$ of FIGS. 5B-D.

Figure 5B:
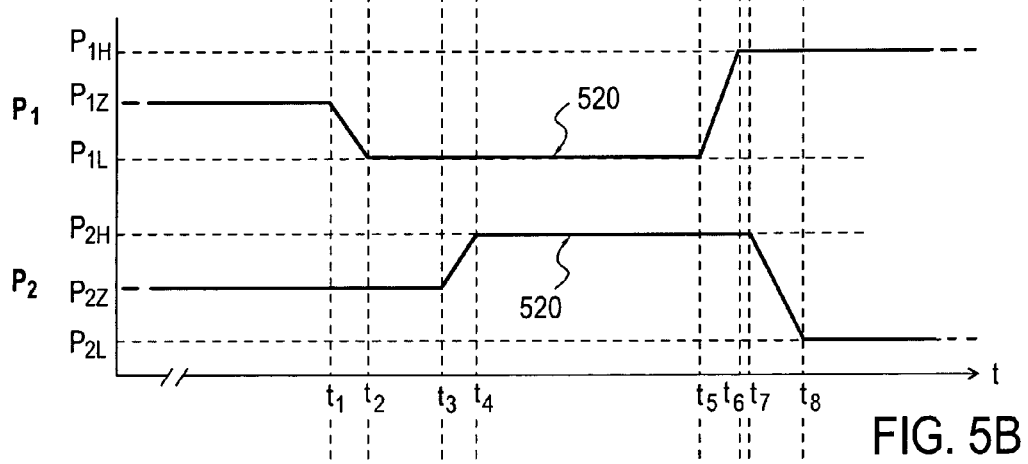
FIG. 5B is an exemplary timing diagram illustrating a pair of differential logic signals in which the pair of differential logic signals comprises the pair of illustrative logic signals of FIG. 5A without any signal correction.
Figure 5C:
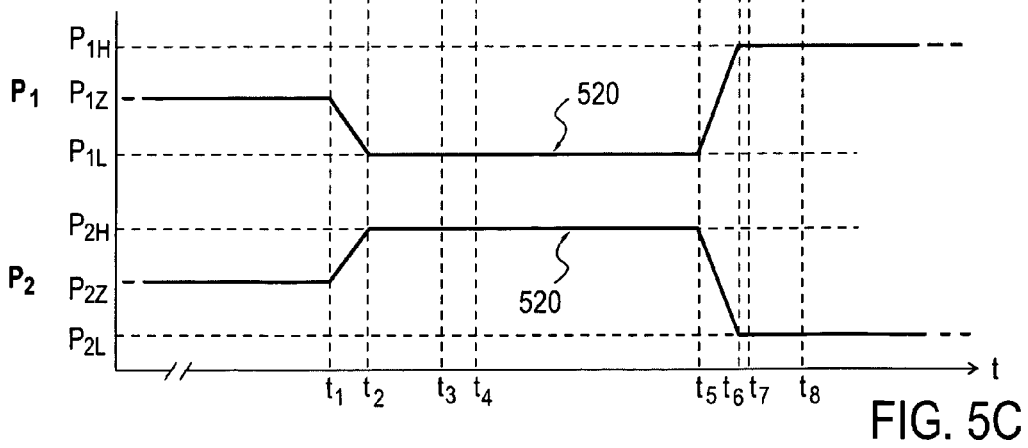
FIG. 5C is an exemplary timing diagram illustrating a pair of differential logic signals in which the pair of differential logic signals comprises a selected one of illustrative logic signals of FIG. 5A converted as a single-sided logic signal in accordance with the method of FIG. 4A.
Figure 5D:
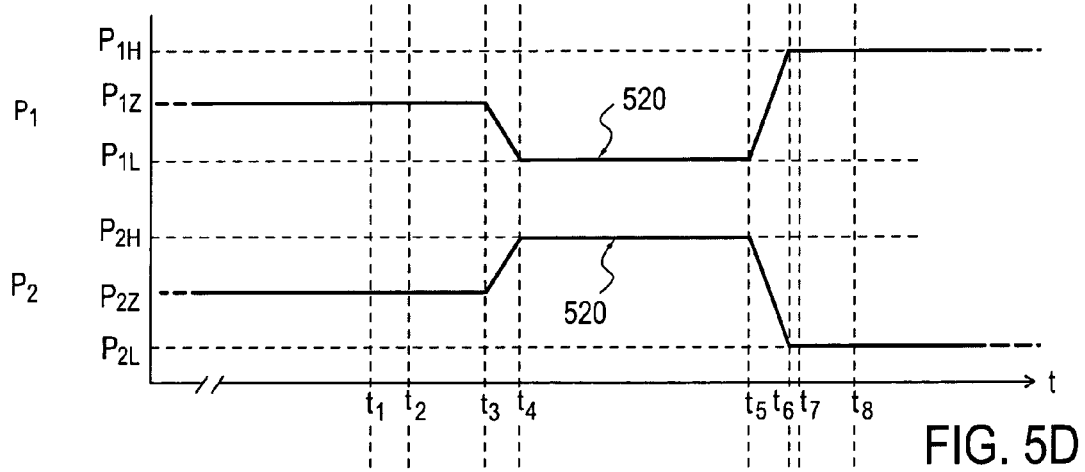
FIG. 5D is an exemplary timing diagram illustrating a pair of differential logic signals in which the pair of differential logic signals comprises the pair of illustrative logic signals of FIG. 5A converted in accordance with a method in which a selected signal state of the logic signals dominates the conversion.

In the manner discussed in more detail above with reference to the single-ended logic signal L (shown in FIG. 4B) and the differential logic signals $P_1$, $P_2$ (shown in FIG. 4C), the exemplary pair of logic signals $L_1$, $L_2$ of FIG. 5A and the illustrative pairs of differential logic signals $P_1$, $P_2$ of FIGS. 5B-D can comprise conventional logic signals of any suitable kind. The logic signals $L_1$, $L_2$ and the differential logic signals $P_1$, $P_2$ each can have any appropriate number of signal states and are shown and described for purposes of illustration as having three separate signal states: a high voltage (or logic) state, a low voltage (or logic) state, and a high-impedance signal state. As set forth above, the respective high-impedance signal states of the logic signals $L_1$, $L_2$ and the differential logic signals $P_1$, $P_2$ are represented by a voltage (or logic) level intermediate between the relevant low and high voltage (or logic) states.

The exemplary pair of logic signals $L_1$, $L_2$ is described with reference to FIG. 5A. Turning to FIG. 5A, the first logic signal $L_1$ is shown as being in the high-impedance signal state with an intermediate voltage level $L_{1Z}$ prior to time $t_1$. The first logic signal $L_1$ likewise has the low voltage level $L_{1L}$ of the low logic state between time $t_2$ and time $t_5$ and the high voltage level $L_{1H}$ of the high logic state after time $t_6$ as shown in FIG. 5A. The first logic signal $L_1$ also is illustrated as transitioning from the intermediate voltage level $L_{1Z}$ of the high-impedance signal state to the low voltage level $L_{1L}$ of the low logic state between time $t_1$ and time $t_2$ and as transitioning from the low voltage level $L_{1L}$ of the low logic state to the high voltage level $L_{1H}$ of the high logic state between time $t_5$ and time $t_6$. Although shown and described as being transitions over finite periods of time for purposes of illustration, the signal state changes of the first logic signal $L_1$ can be provided in any desired manner as described with reference to the logic signal L (shown in FIG. 4B).

Similarly, the second logic signal $L_2$ is illustrated as being in the high-impedance signal state with an intermediate voltage level $L_{2Z}$ prior to time $t_3$. The second logic signal $L_2$ has the high voltage level $L_{2H}$ of the high logic state between time $t_4$ and time $t_7$ and the low voltage level $L_{2L}$ of the low logic state after time $t_8$. As shown in FIG. 5A, the second logic signal $L_2$ likewise transitions from the intermediate voltage level $L_{2Z}$ of the high-impedance signal state to the high voltage level $L_{2H}$ of the high logic state between time $t_3$ and time $t_4$ and transitions from the high voltage level $L_{2H}$ of the high logic state to the low voltage level $L_{2L}$ of the low logic state between time $t_7$ and time $t_8$. In the manner set forth above, the signal state changes of the second logic signal $L_2$ are shown and described as being transitions over finite periods of time for purposes of illustration and can be provided in any desired manner.

Although shown and described as consistently preceding the transitions of the second logic signal $L_2$ for purposes of illustration, each of the transitions of the first logic signal $L_1$ can occur at any suitable time relative to the transitions of the second logic signal $L_2$. Stated somewhat differently, the first logic signal $L_1$ and the second logic signal $L_2$ can comprise substantially independent signals. One or more of the transitions of the second logic signal $L_2$ therefore can precede a selected transition of the first logic signal $L_1$. The transitions of the logic signals $L_1$, $L_2$ likewise can at least partially overlap, as desired. The logic signals $L_1$, $L_2$ thereby can transition between signal states at approximately the same time.

The pair of logic signals $L_1$, $L_2$ can be converted into the pair of differential logic signals $P_1$, $P_2$ (shown in FIGS. 5B-D) in any suitable manner. As discussed above, however, conventional methods for converting the pair of logic signals $L_1$, $L_2$ into the pair of differential logic signals $P_1$, $P_2$ can prove problematic. For example, the differential logic signals $P_1$, $P_2$ in the resultant pair may not be internally consistent. In other words, the combination of the signal state of the first differential logic signal $P_1$ and the signal state of the second differential logic signal $P_2$ should consistently represent a valid combined signal state, even as the signal states of one or more of the differential logic signals $P_1$, $P_2$ change over time t.

For purposes of the illustrative pairs of differential logic signals $P_1$, $P_2$ shown in FIGS. 5B-D, three combined signal states are defined as valid combined signal states. The first valid combined signal state occurs when the differential logic signals $P_1$, $P_2$ each are in the respective high-impedance signal states. In the second valid combined signal state, the first differential logic signal $P_1$ is in the high logic state; while, the second differential logic signal $P_2$ is in the low logic state. The differential logic signals $P_1$, $P_2$ are respectively in the low and high logic states in the third valid combined signal state. Any other combination of respective signal states comprise indeterminate combined signal states and are not valid. The indeterminate combined signal states for the differential logic signals $P_1$, $P_2$ typically occur at a result of a change of signal state by one or more of the underlying logic signals $L_1$, $L_2$. When the pair of illustrative differential logic signals $P_1$, $P_2$ are provided in an indeterminate combined signal state, signaling glitches and other errors can result.

Turning to FIG. 5B, for example, one illustrative conversion method includes providing the pair of exemplary logic signals $L_1$, $L_2$ (shown in FIG. 5A) as the pair of differential logic signals $P_1$, $P_2$ without any correction. The resulting pair of differential logic signals $P_1$, $P_2$ is illustrated in FIG. 5B. While generally providing the pair of differential logic signals $P_1$, $P_2$ having valid combined signal states, the absence of any correction also permits the illustrative conversion method to provide the pair of differential logic signals $P_1$, $P_2$ with indeterminate combined signal states. As shown in FIG. 5B, the differential logic signals $P_1$, $P_2$ have indeterminate combined signal states, for example, during the period of time between time $t_2$ and time $t_3$ as well as during the period of time between time $t_6$ and time $t_7$.

To avoid providing the pair of differential logic signals 520 with indeterminate combined signal states, other methods for converting the pair of logic signals 510 exist and provide correction. For example, an illustrative conversion method includes providing the pair of exemplary logic signals $L_1$, $L_2$ (shown in FIG. 5A) as the pair of differential logic signals $P_1$, $P_2$ with correction is shown in FIG. 5C. The conversion method shown in FIG. 5C includes selecting one of the logic signals $L_1$, $L_2$ and converting the selected logic signals $L_1$, $L_2$ into the pair of differential logic signals $P_1$, $P_2$ in the manner set forth above with reference to FIGS. 4A-C for the single-ended logic signal L (shown in FIG. 4B). FIG. 5C illustrates the conversion method when the logic signal $L_1$ is selected to be the selected logic signal $L_1$, $L_2$. Although inhibiting the presentation of indeterminate combined signal states, the conversion method illustrated in FIG. 5C arbitrarily ignores the unselected logic signal $L_1$, $L_2$. The timing for the pair of differential logic signals $P_1$, $P_2$ likewise can be adversely affected such that the transitions between combined signal states for the pair of differential logic signals $P_1$, $P_2$ occur too early or too late relative to other system signals (not shown).

FIG. 5D illustrates another illustrative method for converting the pair of logic signals 510 with correction to avoid providing the pair of resultant differential logic signals 520 with indeterminate combined signal states. The conversion method shown in FIG. 5D includes selecting a signal state of the exemplary logic signals $L_1$, $L_2$ (shown in FIG. 5A) and converting the logic signal $L_1$, $L_2$ into the pair of differential logic signals $P_1$, $P_2$ while allowing the selected signal state to dominate the conversion. FIG. 5C illustrates the conversion method when the high voltage (or logic) state is selected. Although inhibiting the presentation of indeterminate combined signal states, the conversion method illustrated in FIG. 5D arbitrarily selects the dominant signal state. The duty cycle of the pair of differential logic signals $P_1$, $P_2$ thereby is adversely affected and can become unbalanced.

The challenges illustrated above with reference to FIGS. 5A-D as well as other challenges associated with the conversion of the pairs of logic signals 510 into the pairs of differential logic signals 520 can be overcome via the signal conversion system 600 (shown in FIG. 3), which preferably performs signal validation, as desired, such that the pair of differential logic signals 520 are consistent. The pair of differential logic signals 520 thereby is provided with a combined signal state among the valid combined signal states. One exemplary method 700' for converting the pairs of logic signals 510 with signal validation is shown and illustrated with reference to FIGS. 6A-C. Although shown and described with reference to FIGS. 6A-C as comprising a series of discrete operations for purposes of illustration only, the exemplary method 700' can perform the operations in any suitable manner, including any appropriate order and/or sequence, and preferably performs the conversion instantaneously in zero time.

Figure 6B:
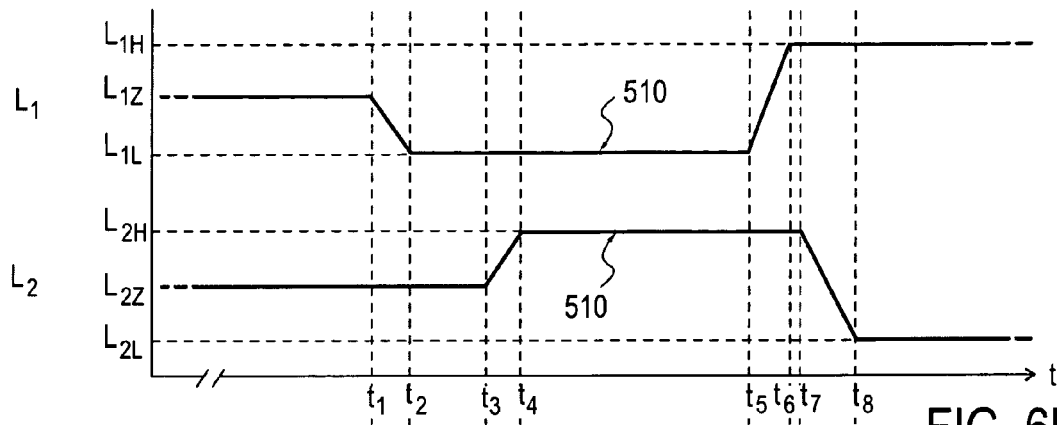
FIG. 6B-C are an exemplary timing diagram illustrating the method of FIG. 6A by which the pair of illustrative logic signals of FIG. 5A is converted into a pair of differential logic signals.
Figure 6C:
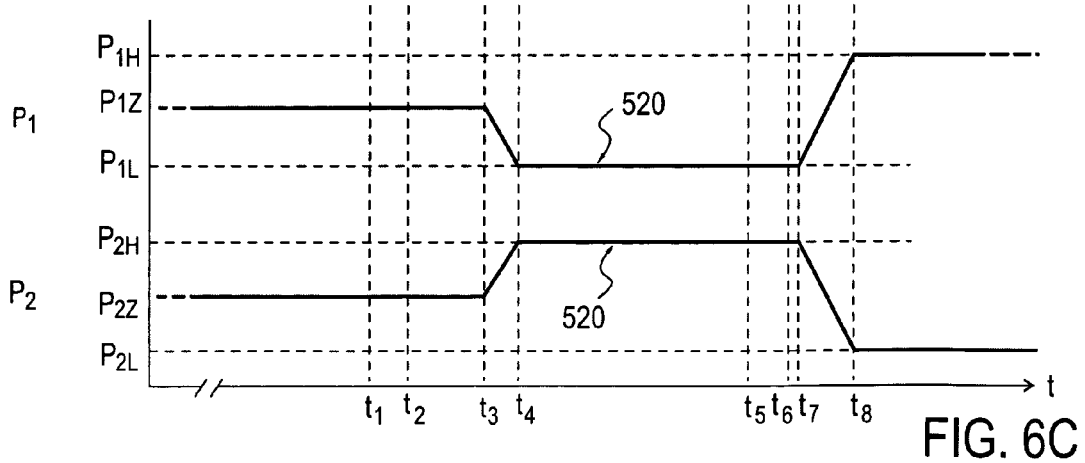
Figure 6A:
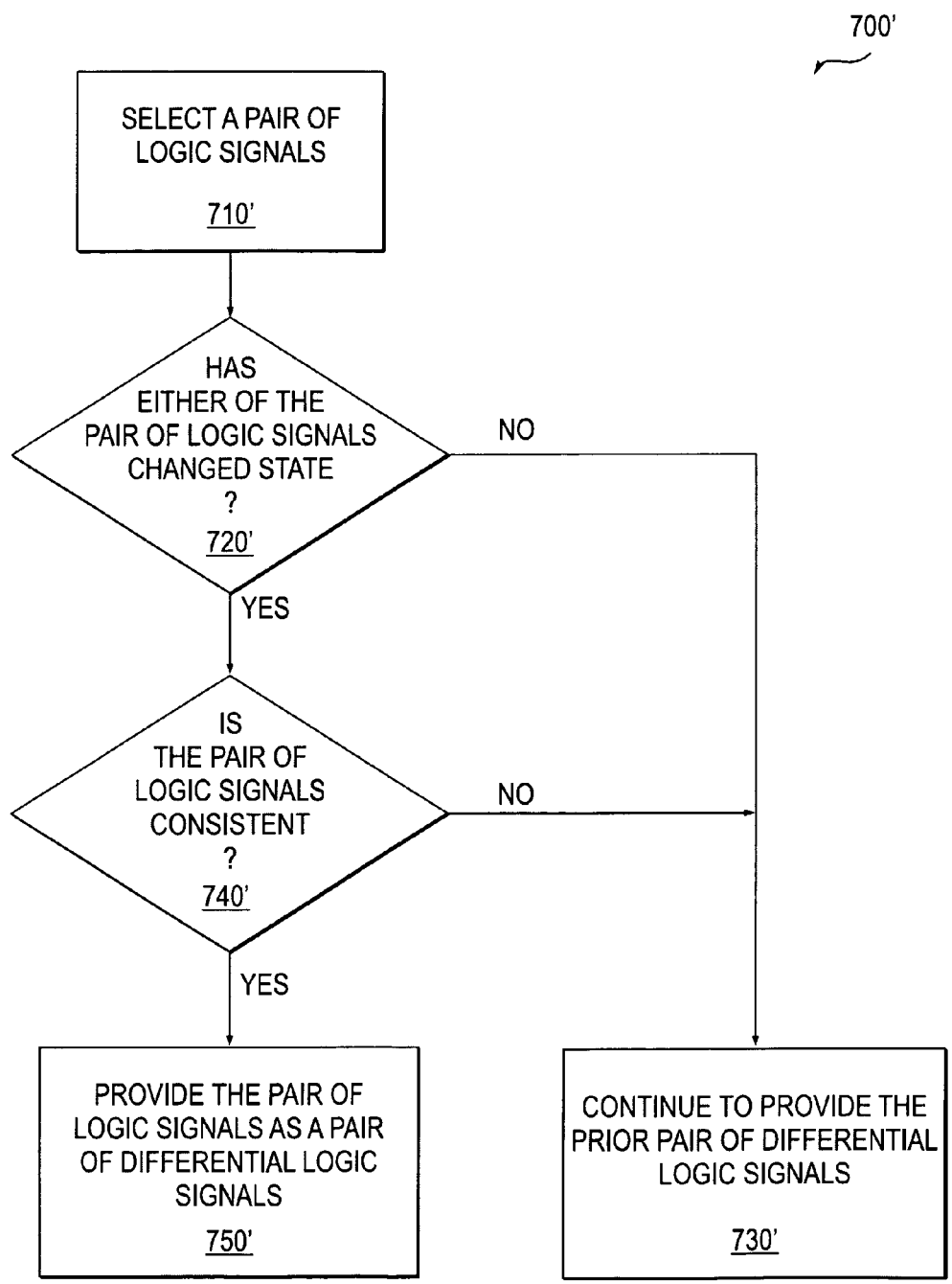
FIG. 6A is an exemplary flowchart illustrating a method for converting pairs of incoming logic signals into pairs of differential logic signals.

Turning to FIG. 6A, the method 700' includes, at 710', selecting at least one pair of logic signals 510 as pairs of the logic signals $L_1$, $L_2$ (shown in FIG. 6B). The pairs of the logic signals $L_1$, $L_2$ can be selected in any suitable manner and number, such as individual pairs and/or pair groups, including in the number and/or manner set forth in more detail above with reference to the selection of the single-ended logic signals L (shown in FIGS. 4A-C). The logic signals $L_1$, $L_2$ in each of the selected pairs are examined, at 720', to determine whether one or more of the logic signals $L_1$, $L_2$ in the relevant pair has changed signal state. If neither of the logic signals $L_1$, $L_2$ in the relevant pair has changed signal state, then the relevant pair of logic signals $L_1$, $L_2$ is provided as the pair of differential logic signals $P_1$, $P_2$. The pair of differential logic signals $P_1$, $P_2$ can be provided in any suitable manner and number, such as individual pairs and/or pair groups, including in the number and/or manner set forth in more detail above with reference to the presentation of the pair of differential logic signals $P_1$, $P_2$ (shown in FIGS. 4A-C).

Since the signal states of the relevant pair of logic signals $L_1$, $L_2$ remain unchanged, the combined signal state for the associated pair of differential logic signals $P_1$, $P_2$ can be maintained as illustrated, at 730', in the method 770' of FIG. 6A. The relevant pair of logic signals $L_1$, $L_2$ likewise can be reasserted as the associated pair of differential logic signals $P_1$, $P_2$, and/or the combined signal state of the associated pair of differential logic signals $P_1$, $P_2$ can again be provided. Stated somewhat differently, the combined signal state of the associated pair of differential logic signals $P_1$, $P_2$ can be maintained in any suitable manner, including by representation of the relevant pair of logic signals $L_1$, $L_2$ and/or by continuing to provide the prior combined signal state of the associated pair of differential logic signals $P_1$, $P_2$, when the signal states of the relevant pair of logic signals $L_1$, $L_2$ remain unchanged. The combined signal state of the associated pair of differential logic signals $P_1$, $P_2$ thereby remains among the valid combined signal states.

If one or more of the logic signals $L_1$, $L_2$ in the relevant pair has changed signal state, the relevant pair of logic signals $L_1$, $L_2$ is examined, at 740', to determine whether the logic signals $L_1$, $L_2$ in the relevant pair are consistent. In other words, the updated (or new or current) signal states of the logic signals $L_1$, $L_2$ in the relevant pair can be examined to determine whether, if provided as the associated pair of differential logic signals $P_1$, $P_2$, the combined signal state of the resultant pair of differential logic signals $P_1$, $P_2$ would be among the valid combined signal states as discussed above. The logic signals $L_1$, $L_2$ in the relevant pair, if consistent, can be provided, at 750', as the associated pair of differential logic signals $P_1$, $P_2$ in the number and/or manner discussed above. The associated pair of differential logic signals $P_1$, $P_2$ thereby is provided with a valid combined signal state for the pair of differential logic signals $P_1$, $P_2$. Otherwise, the combined signal state of the associated pair of differential logic signals $P_1$, $P_2$ can be maintained, at 730', in the manner discussed above. By examining the updated signal states in each pair of logic signals $L_1$, $L_2$, the associated pairs of differential logic signals $P_1$, $P_2$ each are provided with valid combined signal states while maintaining duty cycle and avoiding signaling glitches.

To illustrate some of the advantages of the exemplary method 700' over conventional conversion methods, the conversion of the pair of the exemplary logic signals $L_1$, $L_2$ of FIG. 5A into a pair of differential logic signals $P_1$, $P_2$ is discussed and shown with reference to FIGS. 6B-C. The pair of the exemplary logic signals $L_1$, $L_2$ (shown in FIG. 5A) used to demonstrate the challenges associated with the conventional conversion methods with reference to FIGS. 5B-D has been reproduced in FIG. 6B to facilitate the comparison with the exemplary method 700'. In the manner discussed in more detail above with reference to FIGS. 5B-D, the pair of differential logic signals $P_1$, $P_2$ are defined to have three valid combined signal states. Any other combination of respective signal states therefore comprise indeterminate combined signal states and are not valid.

Turning to FIGS. 6B-C, the pair of the exemplary logic signals $L_1$, $L_2$ each are respectively shown as being in the high-impedance signal state with intermediate voltage levels $L_{1Z}$, $L_{2Z}$ prior to time $t_1$. The high-impedance signal states of the pair of the exemplary logic signals $L_1$, $L_2$, if provided as the pair of differential logic signals $P_1$, $P_2$, corresponds with the first valid combined signal state as defined above with reference to FIGS. 5B-D. Since the exemplary logic signals $L_1$, $L_2$ are consistent, the exemplary logic signals $L_1$, $L_2$ can be provided as the pair of differential logic signals $P_1$, $P_2$ prior to time $t_1$ as shown in FIG. 6B. Although the pair of the exemplary logic signals $L_1$, $L_2$ are not shown in FIG. 6B as changing state prior to time $t_1$, the pair of the exemplary logic signals $L_1$, $L_2$ were examined in the manner set forth above to initialize the pair of differential logic signals $P_1$, $P_2$ and to demonstrate that the pair of differential logic signals $P_1$, $P_2$ have a valid combined signal state prior to time $t_1$.

While the second logic signal $L_2$ is illustrated as being in the high-impedance signal state prior to time $t_3$, the first logic signal $L_1$ is shown as transitioning from the high-impedance signal state to the low logic state beginning at time $t_1$ and as entering the low logic state at time $t_2$. Since at least one of the logic signals $L_1$, $L_2$ has changed signal state, the pair of logic signals $L_1$, $L_2$ are examined for consistency. Here, the low logic state of the first logic signal $L_1$ and the high-impedance signal state of the second logic signal $L_2$, if the pair of logic signals $L_1$, $L_2$, were provided as the pair of differential logic signals $P_1$, $P_2$, do not correspond with any of the valid combined signal states defined above with reference to FIGS. 5B-D. As set forth above, the pair of logic signals $L_1$, $L_2$ therefore are not consistent, and the pair of differential logic signals $P_1$, $P_2$ maintain the first valid combined signal state as illustrated in FIG. 6B.

Similarly, the pair of logic signals $L_1$, $L_2$ can be subsequently examined for consistency, for example, during the period of time intermediate between time $t_2$ and time $t_3$. During the intermediate time period, the first and second logic signals $L_1$, $L_2$ are shown as maintaining the low logic state and the high-impedance signal state, respectively. Neither the first logic signal $L_1$ nor the second logic signal $L_2$ therefore is illustrated as changing its respective signal state since time $t_2$. As a result, the pair of differential logic signals $P_1$, $P_2$ continue to maintain the first valid combined signal state as set forth above. FIG. 6C therefore shows the pair of differential logic signals $P_1$, $P_2$ in the first valid combined signal state during the period of time intermediate between time $t_2$ and time $t_3$.

The second logic signal $L_2$ is illustrated as transitioning from the high-impedance signal state to the high logic state beginning at time $t_3$ and as entering the high logic state at time $t_4$; while, the first logic signal $L_1$ is shown as maintaining the low logic state. Since at least one of the logic signals $L_1$, $L_2$ has changed signal state, the pair of logic signals $L_1$, $L_2$ again are examined for consistency. During this time period, the low logic state of the first logic signal $L_1$ and the high logic state of the second logic signal $L_2$, if the pair of logic signals $L_1$, $L_2$, were provided as the pair of differential logic signals $P_1$, $P_2$, with the third valid combined signal state as defined above with reference to FIGS. 5B-D. Since the exemplary logic signals $L_1$, $L_2$ are consistent, the exemplary logic signals $L_1$, $L_2$ can be provided as the pair of differential logic signals $P_1$, $P_2$ beginning at time $t_4$. The pair of differential logic signals $P_1$, $P_2$ therefore is shown as having the third valid combined signal state in FIG. 6C beginning at time $t_4$.

In the manner discussed above, the pair of logic signals $L_1$, $L_2$ likewise can be examined for consistency, for example, during the period of time intermediate between time $t_4$ and time $t_5$. The first and second logic signals $L_1$, $L_2$ are shown as respectively maintaining the low and high logic states during the intermediate time period. In other words, neither the first logic signal $L_1$ nor the second logic signal $L_2$ is illustrated as changing its respective signal state since time $t_4$. The pair of differential logic signals $P_1$, $P_2$ therefore can continue to maintain the third valid combined signal state during the period of time intermediate between time $t_4$ and time $t_5$ as illustrated in FIG. 6C. The remainder of the pair of differential logic signals $P_1$, $P_2$ can be produced by continuing to apply the exemplary method 700' (shown in FIG. 6A) to the pair of logic signals $L_1$, $L_2$ for the remaining time periods shown in FIG. 6B. FIG. 6C demonstrates that the resultant pair of differential logic signals $P_1$, $P_2$ advantageously comprises valid combined signal states while maintaining duty cycle and avoiding signaling glitches.

Figure 7:
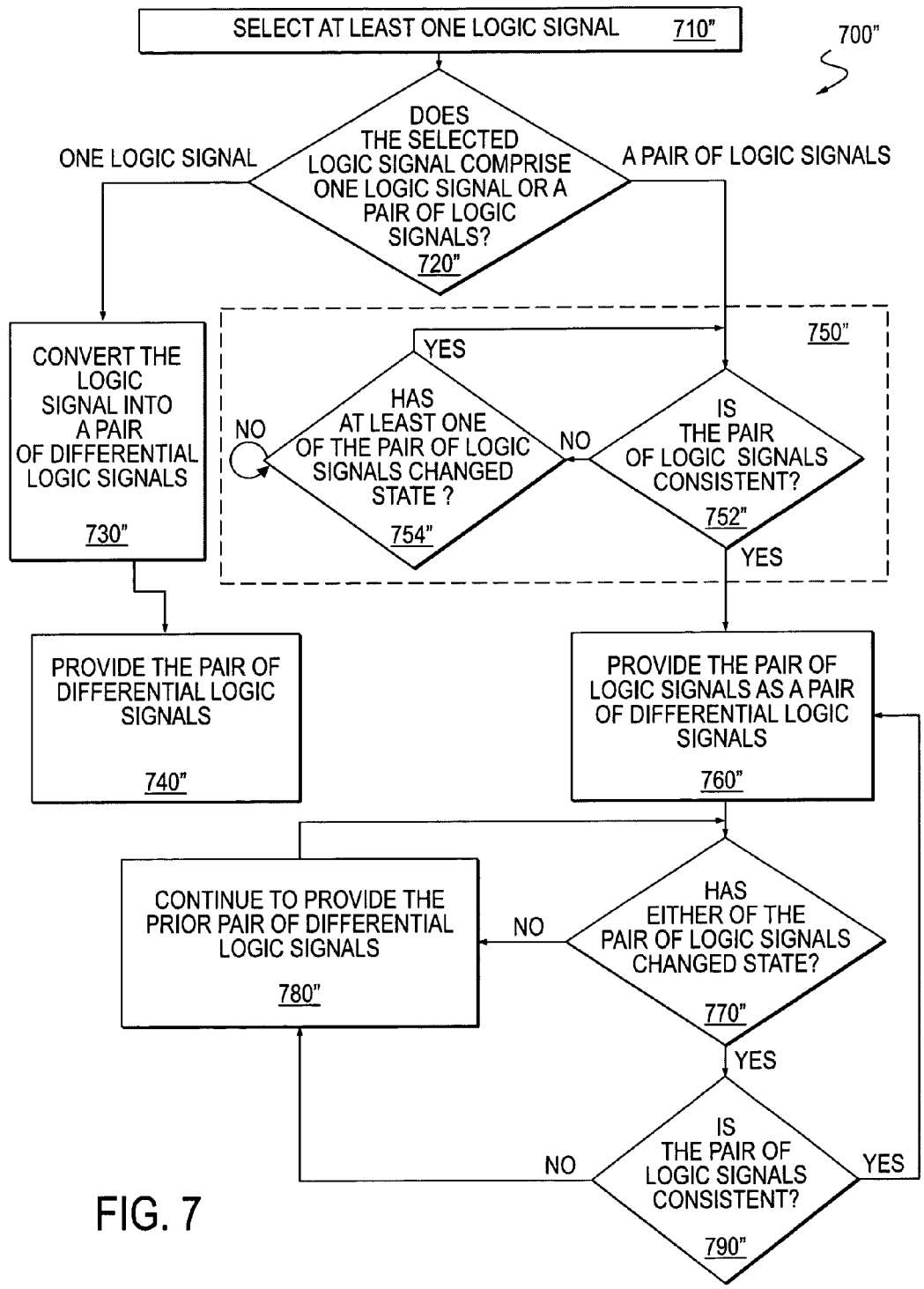
FIG. 7 is an exemplary flowchart illustrating a method for converting incoming logic signals, including individual logic signals and pairs of logic signals, into pairs of differential logic signals.

As discussed above, the signal conversion system 600 (shown in FIG. 3) can convert one or more incoming logic signals 510 into pairs of differential logic signals 520 in any suitable manner. For example, the signal conversion system 600 can be configured to convert individual logic signals 510, such as the single-ended logic signals L (shown in FIG. 4B), and pairs of logic signals 510, such as the pairs of logic signals $L_1$, $L_2$ (shown in FIG. 6B). The signal conversion system 600 likewise can initialize the pairs of differential logic signals 520, as desired. FIG. 7 illustrates one exemplary method 700" for converting the incoming logic signals 510, including individual logic signals and pairs of logic signals, into pairs of differential logic signals 520, which can be initialized to a valid combined signal state. To help ensure that the pairs of differential logic signals 520 are provided with valid signal states, signal validation is performed, as desired, such that the differential logic signals 520 in the pair are consistent.

Turning to FIG. 7, the exemplary method 700" includes, at 710", selecting at least one of the incoming logic signals 510. The selected logic signals 510' (shown in FIG. 8) can be selected in any suitable manner and number, such as individual pairs and/or pair groups, including in the number and/or manner set forth in more detail above with reference to the selection of the single-ended logic signals L (shown in FIGS. 4A-C) and/or the pairs of pairs of logic signals $L_1$, $L_2$ (shown in FIGS. 6A-C). The selected logic signals 510' are examined, at 720", to determine whether any of the selected logic signals 510' that should be converted individually and/or whether any of the selected logic signals 510' that should be converted in pairs. If any of the selected logic signals 510' are identified for individual conversion, the relevant logic signals 510' are converted, at 730", as individual logic signals 510 into pairs of differential logic signals 520 in the manner set forth in more detail above regarding the conversion of the selected single-ended logic signals L (shown in FIGS. 4A-C). Once the relevant logic signals 510' have been converted, the resultant pairs of differential logic signals 520 can be provided, at 740", as discussed in more detail above with reference to FIGS. 4A-C.

Any pairs of logic signals 510 are identified for conversion can be converted into pairs of differential logic signals 520 in the manner set forth in more detail above regarding the conversion of the pairs of logic signals $L_1$, $L_2$ (shown in FIGS. 6A-C). As desired, the pairs of differential logic signals 520 can be initialized, at 750", such that the pairs of differential logic signals 520 begin in a valid combined signal state. The pairs of differential logic signals 520 can be initialized in any conventional manner, including by providing a default combined signal state among the valid combined signal states for the pairs of differential logic signals 520. The pairs of logic signals 510 likewise can be evaluated when the pairs of differential logic signals 520 are being initialized.

As shown in FIG. 7, for example, the signal states of each pair of logic signals 510 can be examined, at 752", to determine whether the logic signals 510 in the relevant pair are consistent. The logic signals 510 in the relevant pair can be examined for consistency in any suitable manner, including the manner set forth in more detail above regarding the conversion of the pairs of the logic signals $L_1$, $L_2$ (shown in FIGS. 6A-C). If consistent, the pair of logic signals 510 can be provided, at 760", as the pair of differential logic signals 520, which have been initialized to an initial valid combined signal state. The pair of differential logic signals 520 can be provided as discussed in more detail above with reference to FIGS. 6A-C.

If the logic signals 510 in the relevant pair are not consistent, the pair of logic signals 510 are examined, at 754", to determine whether one or more of the logic signals 510 in the pair has changed signal state. The pair of logic signals 510 can be examined in any appropriate manner, including the manner discussed above with reference to FIGS. 6A-C. Once at least one of the logic signals 510 in the pair has changed signal state, the signal states of each pair of logic signals 510 again can be examined, at 752", for consistency. If consistent, the pair of logic signals 510 can be provided, at 760", as the pair of differential logic signals 520 as discussed above; otherwise, the pair of logic signals 510 again are examined, at 754", for signal state changes in the manner set forth above. The pair of differential logic signals 520 thereby can be initialized to an initial valid combined signal state.

Once the pair of differential logic signals 520 have been initialized, the pairs of logic signals 510 can subsequently be converted into associated pairs of differential logic signals 520 in the manner set forth in more detail above regarding the conversion of the pairs of logic signals $L_1$, $L_2$ (shown in FIGS. 6A-C). The logic signals 510 in each of the selected pairs are examined, at 770", to determine whether one or more of the logic signals 510 in the relevant pair has changed signal state in the manner discussed above. If neither of the logic signals 510 in the relevant pair has changed signal state, the combined signal state for the associated pair of differential logic signals 520 can be maintained, at 780", as set forth in more detail above with reference to the pairs of differential logic signals $P_1$, $P_2$ (shown in FIGS. 6A-C).

If one or more of the logic signals 510 in the relevant pair has changed signal state, the relevant pair of logic signals 510 is examined, at 790", in the manner discussed above to determine whether the logic signals 510 in the relevant pair are consistent. The logic signals 510 in the relevant pair, if consistent, can be provided, at 760", as the associated pair of differential logic signals 520. The associated pair of differential logic signals 520 thereby is provided with a valid combined signal state for the pair of differential logic signals 520. Otherwise, the combined signal state of the associated pair of differential logic signals 520 can be maintained, at 780", in the manner discussed above. By examining the updated signal states in each pair of logic signals 510, the associated pairs of differential logic signals 520 each are provided with valid combined signal states while maintaining duty cycle and avoiding signaling glitches.

Figure 8:
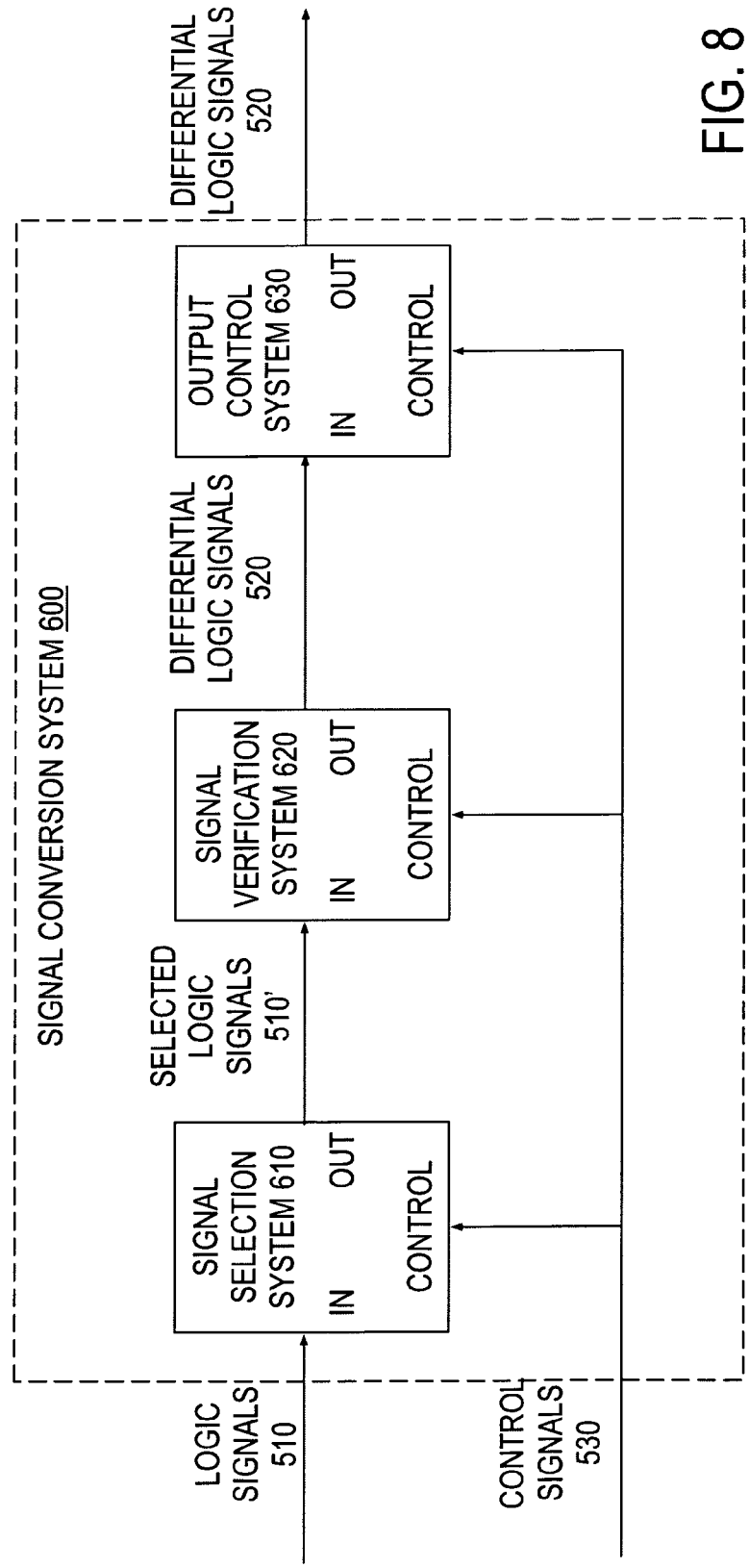
FIG. 8 is an exemplary block diagram illustrating an embodiment of the signal conversion system of FIG. 3 in which the signal conversion system includes a signal selection system for selecting at least one of the incoming logic signals for conversion and a signal verification system for verifying that the selected logic signals are suitable for being provided as differential logic signals.

FIG. 8 illustrates one embodiment of the signal conversion system 600. In the manner discussed above with reference to FIG. 3, the signal conversion system 600 is configured to receive incoming logic signals 510 and to convert the selected logic signals 510' into pairs of differential logic signals 520. The signal conversion system 600 likewise can receive one or more control signals 530 for controlling the manner in which the logic signals 510 are selected and/or converted and/or the manner in which the pairs of differential logic signals 520 are provided. To help ensure that the pairs of differential logic signals 520 are provided with valid signal states, the signal conversion system 600 preferably performs signal validation in the manners set forth in more detail above with reference to FIGS. 4A-C, 6A-C, and 7. Thereby, the signal conversion system 600 can provide the pairs of differential logic signals 520 with valid combined signal states while maintaining duty cycle and avoiding signaling glitches.

The signal conversion system 600 is shown as including a signal selection system 610 for receiving the logic signals 510 and a signal verification system 620 for converting the selected logic signals 510' into pairs of differential logic signals 520. The signal selection system 610 can be provided in any conventional matter and, as illustrated in FIG. 8, includes a plurality of input terminals IN and at least one output terminal OUT. The input terminals IN of the signal selection system 610 are configured to receive a suitable number of the logic signals 510; whereas, the output terminal OUT can provide the selected logic signals 510' in any appropriate number. The signal selection system 610 likewise can include one or more control terminals CONTROL for selecting one input terminals IN for each output terminal OUT of the signal selection system 610.

The control terminals CONTROL of the signal selection system 610 can be configured to receive one or more of the control signals 530 for selecting the selected input terminals IN. The control signals 530 can be provided by any suitable source, including the source of the logic signals 510 and/or the destination for each pair of differential logic signals 520. Although shown and discussed herein as receiving the logic signals 510 and the control signals 530 from the hardware emulation system 200' (shown in FIG. 2) for purposes of illustration, the signal conversion system 600 can receive the control signals 530 from any suitable source, including one or more of the target systems 300 (shown in FIG. 1), communication cable assemblies 400 (shown in FIG. 2), and/or external systems or devices. Once the appropriate input terminals IN have been selected, the signal selection system 610 can provide the logic signals 510 associated with the selected input terminals IN as the selected logic signals 510' via the output terminals OUT.

The signal verification system 620 likewise can be provided in any conventional matter and is shown as including at least one input terminal IN and at least two output terminals OUT. The input terminals IN of the signal verification system 620 are coupled with the output terminals OUT of the signal selection system 610 and are suitable in number to receive the selected logic signals 510'. Being configured to convert the selected logic signals 510' into the pairs of differential logic signals 520 in the manner set forth in more detail above, the signal verification system 620 includes an appropriate number of output terminals OUT to provide the pairs of differential logic signals 520, as desired. As desired, the signal verification system 620 can include one or more control terminals CONTROL for receiving one or more of the control signals 530. The manner by which the logic signals 510 are converted into the pairs of differential logic signals 520 thereby can be controlled, as desired, in the manner discussed above.

When available, the pairs of differential logic signals 520 can be provided via the output terminals OUT of the signal verification system 620 to one or more destinations for the pairs of differential logic signals 520. As discussed in more detail above with regard to the source of the logic signals 510, the pairs of differential logic signals 520 can be provided to one or more destinations. The destinations for the pairs of differential logic signals 520 can include any suitable destination, including the source of the logic signals 510. Although shown and discussed herein as providing the pairs of differential logic signals 520 to one or more of the target systems 300 (shown in FIG. 1) for purposes of illustration, the signal conversion system 600 can provide the pairs of differential logic signals 520 to any suitable destination, such as the hardware emulation system 200' (shown in FIG. 2), communication cable assemblies 400 (shown in FIG. 2), and/or external systems or devices.

As desired, the signal verification system 620 can provide the pairs of differential logic signals 520 directly and/or indirectly to each respective destination. As illustrated in FIG. 8, for example, the signal conversion system 600 can include an output control system 630 for controlling the manner by which the differential logic signals 520 are provided to the destinations. The output control system 630 can be provided in any conventional matter and is shown as including at least two input terminals IN and at least two output terminals OUT. The input terminals IN of the output control system 630 are coupled with the output terminals OUT of the signal verification system 620; whereas, the output terminals OUT of the output control system 630 are coupled with the respective destinations. The input terminals IN and the output terminals OUT of the output control system 630 each are suitable in number to receive and provide, respectively, predetermined numbers of the pairs of differential logic signals 520.

The output control system 630 is shown as including at least one control terminal CONTROL for receiving one or more of the control signals 530. The manner by which the pairs of differential logic signals 520 are provided to the respectively destinations thereby can be controlled in the manner discussed above. As desired, the output control system 630 can be configured to store, amplify, and/or drive the pairs of differential logic signals 520 prior to providing the pairs of differential logic signals 520 to the destinations. Although shown and described as comprising separate systems for purposes of illustration, the signal selection system 610, the signal verification system 620, and the output control system 630 can be provided in any suitable manner including via one or more separate and/or integrated systems.

Figure 9:
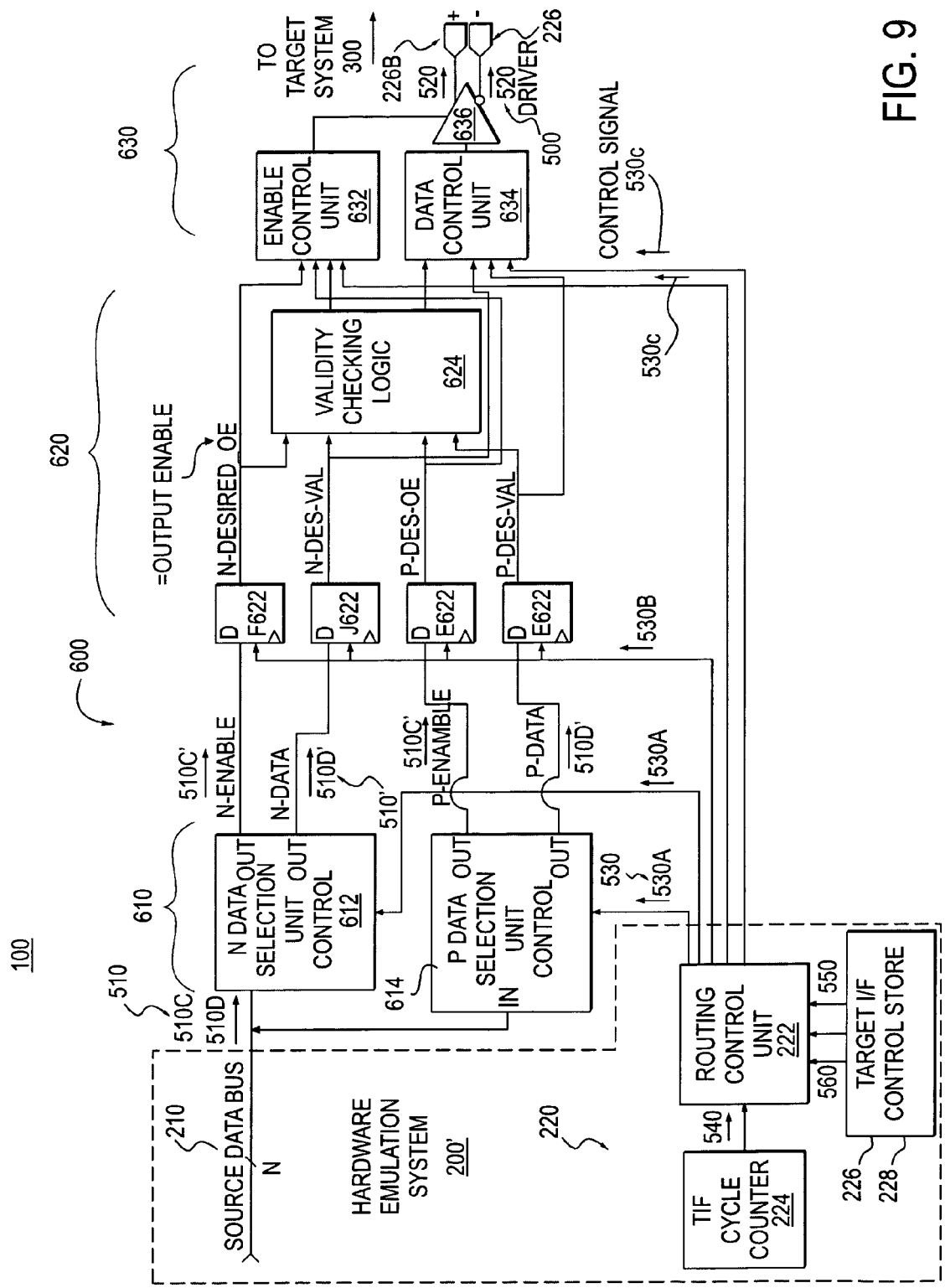
FIG. 9 is an exemplary block diagram illustrating an embodiment of the signal conversion system of FIG. 8.

Turning to FIG. 9, a communication system 100 is illustrated that provides one exemplary implementation of the signal conversion system 600 of FIG. 8. The communication system 100 includes a hardware emulation system 200' and a target system 300, each being providing in the manner discussed in more detail above with reference to FIGS. 1 and 2. The hardware emulation system 200' includes a source data bus 240 for providing logic signals 510, such as data signals 510D, address signals(not shown), and/or control signals 510C. Being configured to communicate with the target system 300, hardware emulation system 200' likewise includes a signal conversion system 600 for receiving the logic signals 510 and for converting selected logic signals 510' into pairs of differential logic signals 520 to be provided to the target system 300. To help ensure that the pairs of differential logic signals 520 are provided with valid signal states, the signal conversion system 600 preferably performs signal validation in the manners set forth in more detail above with reference to FIGS. 4A-C, 6A-C, and 7. Thereby, the signal conversion system 600 can provide the pairs of differential logic signals 520 with valid combined signal states while maintaining duty cycle and avoiding signaling glitches.

The hardware emulation system 200' further is shown as including a control system 250. Being configured to provide control signals 530, the control system 250 comprises a routing control unit 252, a tif cycle counter 254, a target interface system 256, and a control store 258. The tif cycle counter 254 can provide timing signals 540 to the routing control unit 214; whereas, control data signals 550 is stored in the control store 258. The target interface system 256 provides the routing control unit 214 with routing signals 560, which include routing information for exchanging communication signals 500 between the hardware emulation system 200' and the target system 300. Receiving the timing signals 540, the control data signals 550, and the routing signals 560, the routing control unit 252 can provide the control signals 530 for controlling the manner in which the logic signals 510 are selected and/or the manner in which the selected logic signals 510' are converted into the pairs of differential logic signals 520 in the manner discussed in more detail above with reference to FIG. 8. Further details and features relating to the structure and operation of the control system 250 are disclosed in the co-pending United States Patent Application, entitled "METHOD AND CIRCUIT FOR FLEXIBLE ROUTING AND TIMING," application Ser. No. 11/140,714, the entire disclosure of which was incorporated herein by reference as discussed above. The control signals 530 likewise can control the manner by which the pairs of differential logic signals 520 are provided to the target system 300.

The hardware emulation system 200' configured to provide the logic signals 510 to the signal conversion system 600. In the manner discussed above with reference to the signal conversion system 600 (shown in FIG. 8), the signal conversion system 600 can include a signal selection system 610 for receiving the logic signals 510, a signal verification system 620 for converting the selected logic signals 510' into pairs of differential logic signals 520, and an output control system 630 for controlling the manner by which the differential logic signals 520 are provided to the target system 300. As shown in FIG. 9, the signal selection system 610 can include one or more data selection units (or multiplexer systems) 612, 614.

In the manner discussed with reference to the selection system 610 of FIG. 8, the data selection units 612, 614 each include a suitable number of input terminals IN, output terminals OUT, and control terminals CONTROL. The input terminals IN of the data selection units 612, 614 are coupled with the source data bus 240 of the hardware emulation system 200' and can receive the logic signals 510. Being configured to select one input terminals IN for each output terminal OUT of the data selection units 612, 614, the control terminals CONTROL are coupled with, and can receive control signals 530A from, the control system 250 of the hardware emulation system 200'. The output terminals OUT of the data selection units 612, 614, thereby, can provide the selected logic signals 510' to the signal verification system 620 in the manner discussed above. Although shown and described as comprising a pair of data selection units 612, 614 for purposes of illustration, selection system 610 can include any suitable number of data selection units 612, 614.

As shown in FIG. 9, the signal verification system 620 can include a memory system 622 and a logic system 624 for converting the selected logic signals 510' into the pairs of differential logic signals 520 and for performing signal validation for the pairs of differential logic signals 520 in the manner set forth above. Being disposed between the logic system 624 and the data selection units 612, 614 of the signal selection system 610, the memory system 622 has at least one input terminal D for coupling with the output terminals OUT of the data selection units 612, 614 and for receiving the selected logic signals 510'. The memory system 622 likewise includes at least one control terminal E for coupling with the control system 250 and receiving control signals 530B and a suitable number of output terminals Q. In accordance with the control signals 530B, the memory system 622 can store and provide the selected logic signals 510' via the output terminals Q. The memory system 622 is shown in FIG. 9 as comprising four latches (or flip-flops) 626 but may include any number of suitable memory devices, as desired.

The output terminals Q of the memory system 622 are coupled with an appropriate number of input terminals IN of the logic system 624, which are configured to receive the selected logic signals 510'. The logic system 624 can comprise any conventional type of logic system and is configured to convert the selected logic signals 510' into the pairs of differential logic signals 520 in the manner set forth in more detail above. The logic system 624 likewise can include a suitable number of output terminals OUT for providing the resultant pairs of differential logic signals 520. As desired, a second memory system (not shown) can be coupled with, and/or integrated with, the output terminals OUT of the logic system 624 to store and provide the pairs of differential logic signals 520, preferably under the control of the control system 250. Although shown and described as comprising separate systems for purposes of illustration, the memory system 622 and the logic system 624 can be provided in any suitable manner including via one or more separate and/or integrated systems.

The signal verification system 620 likewise is coupled with the output control system 630. Being configured to control the manner by which the differential logic signals 520 are provided to the target system 300, the output control system 630 is illustrated as comprising control units 632, 634 and a driver system 636. Each of the control units 632, 634 include an appropriate number of input terminals IN, which are coupled with the output terminals OUT of the logic system 624 to store and configured to receive the pairs of differential logic signals 520. Likewise including at least one control terminal CONTROL for coupling with, and receiving control signals 530C from, the control system 250, the control units 632, 634 each can provide the appropriate pairs of differential logic signals 520 to the driver system 636 via a suitable number of output terminals OUT in accordance with the control signals 530C.

The driver system 636 includes a suitable number of input terminals IN, output terminals OUT, and control terminals CONTROL. The input terminals IN of the driver system 636 are coupled with the output terminals OUT control units 632, 634 and configured to receive the pairs of differential logic signals 520 provided by the control units 632, 634. Being configured to provide the pairs of differential logic signals 520, as desired, the output terminals OUT of the driver system 636 are coupled with a suitable number of the terminals 226B of the communication port 226 of the hardware emulation system 200'. When the target system 300 is coupled with the relevant communication port 226 of the hardware emulation system 200', the driver system 636 can provide pairs of differential logic signals 520 to the target system 300. In the manner set forth in more detail above, the pairs of differential logic signals 520 thereby can be communicated from the hardware emulation system 200' to the target system 300 with valid combined signal states while maintaining duty cycle and avoiding signaling glitches.

The various embodiments disclosed herein are susceptible to various modifications and alternative forms, and specific examples thereof have been shown by way of example in the drawings and are herein described in detail. It should be understood, however, that the various embodiments disclosed herein are not to be limited to the particular forms or methods disclosed, but to the contrary, the invention is to cover all modifications, equivalents, and alternatives falling within the spirit and scope of the claims.

What is claimed is:

1. A signal conversion system that converts pairs of single-ended logic signals into pairs of differential logic signals, comprising:
    a signal selection system that selects a first logic signal and a second logic signal, wherein each logic signal is a single-ended signal having a signal state;
    a signal verification system that converts said first and second logic signals into a first differential logic signal and a second differential logic signal having a combined signal state among a plurality of valid combined signal states, said combined signal state corresponding to said signal states of said first and second logic signals; and
    an output control system that provides said first and second differential logic signals,
    wherein said signal verification system maintains said first and second differential logic signals in a first combined signal state until said signal states of said first and second logic signals correspond to a second combined signal state at which time said signal verification system updates said first and second differential logic signals to have said second combined signal state.

2. The signal conversion system of claim 1, wherein said first and second logic signals are provided by a hardware emulation system.

3. The signal conversion system of claim 1, wherein said signal conversion system is provided via said hardware emulation system.

4. The signal conversion system of claim 3, wherein said signal conversion system is disposed within an input/output system of said hardware emulation system.

5. The signal conversion system of claim 2, wherein said first and second differential logic signals are provided to a target system.

6. The signal conversion system of claim 5, wherein said first and second differential logic signals are provided to said target system via a communication cable assembly.

7. The signal conversion system of claim 6, wherein said signal conversion system is disposed within said communication cable assembly.

8. A method for converting pairs of single-ended logic signals into pairs of differential logic signals, comprising:
    selecting a first logic signal and a second logic signal, wherein each logic signal is a single-ended signal having a signal state;
    corresponding said signal states of said first and second logic signals with a combined signal state of a first differential logic signal and a second differential logic signal, said combined signal state being among a plurality of valid combined signal states;
    maintaining said first and second differential logic signals in a first combined signal state;
    updating said first and second differential logic signals to have a second combined signal state when said signal states of said first and second logic signals correspond to said second combined signal state; and
    providing said first and second differential logic signals.

9. The method of claim 8, wherein said selecting said first and second logic signals includes selecting said first and second logic signals being provided by a hardware emulation system.

10. The method of claim 9, wherein said providing said first and second differential logic signals includes providing said first and second differential logic signals to a target system.

11. The method of claim 10, wherein said providing said first and second differential logic signals includes providing said first and second differential logic signals to said target system via a communication cable assembly.

12. A method for converting pairs of single-ended logic signals into pairs of differential logic signals, the pairs of single-ended logic signals being provided by a target system, comprising:
    selecting a first logic signal and a second logic signal, wherein each logic signal is a single-ended signal having a signal state and;
    corresponding said signal states of said first and second logic signals with a combined signal state of a first differential logic signal and a second differential logic signal, said combined signal state being among a plurality of valid combined signal states;
    maintaining said first and second differential logic signals in a first combined signal state;
    updating said first and second differential logic signals to have a second combined signal state when said signal states of said first and second logic signals correspond to said second combined signal state; and
    providing said first and second differential logic signals.

13. The method of claim 12, wherein said providing said first and second differential logic signals includes providing said first and second differential logic signals to a hardware emulation system.

14. The method of claim 13, wherein said providing said first and second differential logic signals includes providing said first and second differential logic signals to said hardware emulation system via a communication cable assembly.

15. A communication system, comprising:
    a first system for providing single-ended logic signals;
    an input/output system for providing pairs of differential signals to a second system; and
    a signal conversion system for converting said single-ended logic signals into said pairs of differential logic signals and including:
    a signal selection system for selecting a first logic signal and a second logic signal, wherein each logic signal is a single-ended signal having a signal state; and
    a signal verification system for convening said first and second logic signals into a first differential logic signal and a second differential logic signal having a combined signal state among a plurality of valid combined signal states, said combined signal state corresponding to said signal states of said first and second logic signals, wherein said signal verification system maintains said first and second differential logic signals in a first combined signal state until said signal states of said first and second logic signals correspond to a second combined signal state at which time said signal verification system updates said first and second differential logic signals to have said second combined signal state.

16. The communication system of claim 15, wherein said first system comprises a hardware emulation system.

17. The communication system of claim 15, wherein said input/output system includes at least one reconfigurable logic device.

18. The communication system of claim 17, wherein at least one of said at least one reconfigurable logic device comprises a field-programmable gate array.

* * * * *

UNITED STATES PATENT AND TRADEMARK OFFICE
CERTIFICATE OF CORRECTION

PATENT NO. : 7,606,697 B2 Page 1 of 1
APPLICATION NO. : 11/141141
DATED : October 20, 2009
INVENTOR(S) : Poplack et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this

Twelfth Day of October, 2010

David J. Kappos
*Director of the United States Patent and Trademark Office*